Aug. 5, 1969  H. HUBER ET AL  3,460,024
GAS-FILLED DISCHARGE TUBE AND ELECTRICAL
ENERGY GENERATORS USING THE SAME
Filed July 16, 1965  2 Sheets-Sheet 1
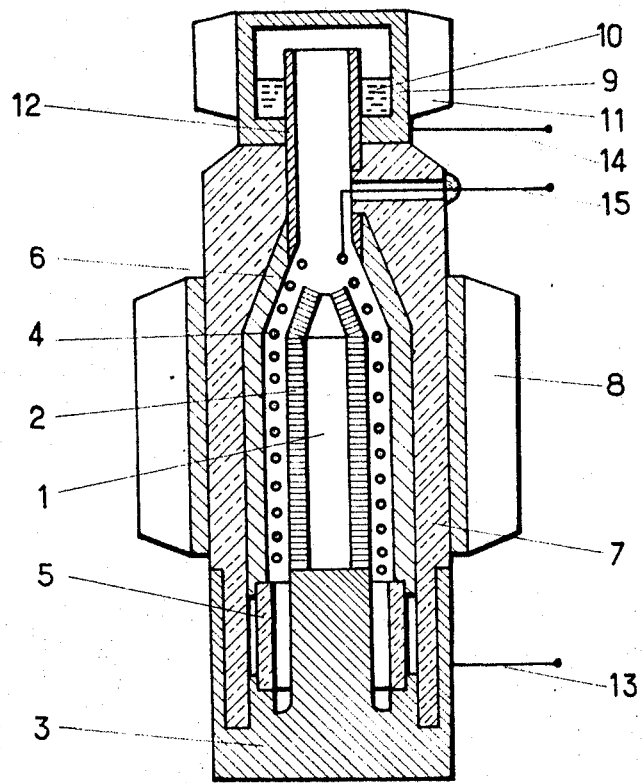
FIG:1
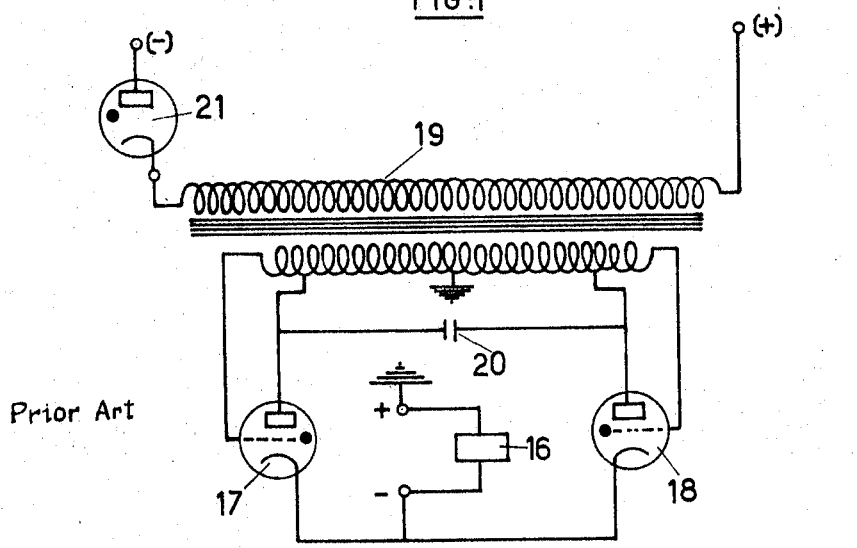
Prior Art
FIG:2
INVENTORS
H. HUBER & G. MONCORGÉ
BY Paul M. Craig, Jr.
ATTORNEY

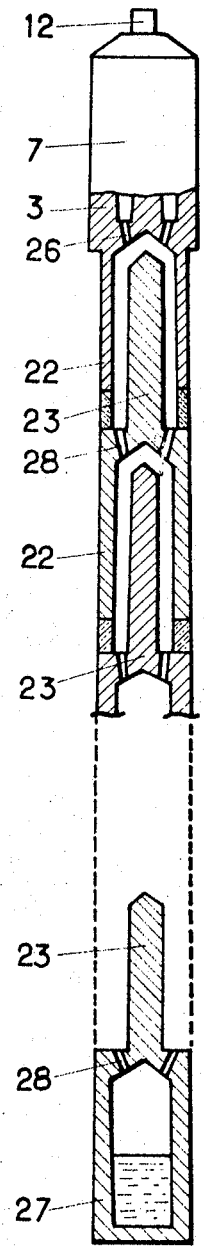
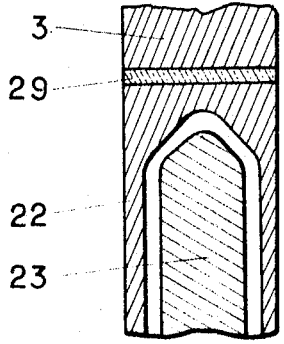
FIG:6
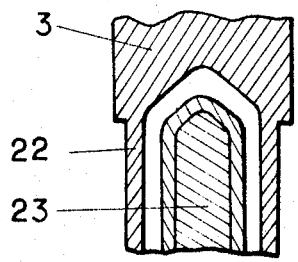
FIG:3
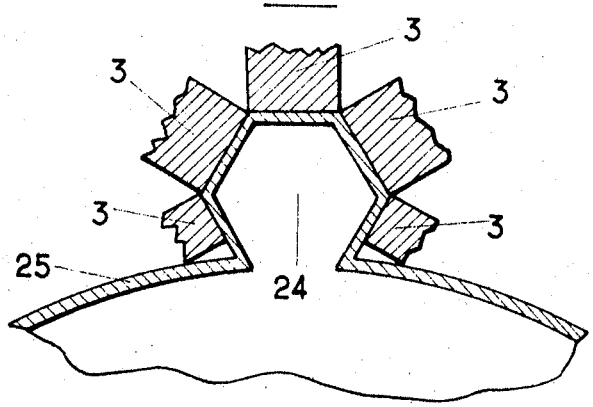
FIG:5          FIG:4
INVENTORS
H. HUBER & G. MONCORGÉ
BY Paul M. Craig, Jr.
ATTORNEY 3,460,024
GAS-FILLED DISCHARGE TUBE AND ELECTRICAL ENERGY GENERATORS USING THE SAME
Harry Huber and Gérard Moncorgé, Paris, France, assignors to CSF—Compagnie Generale de Telegraphie Sans Fil, a corporation of France
Filed July 16, 1965, Ser. No. 472,548
Claims priority, application France, July 16, 1964, 981,881
Int. Cl. H02m 1/02; H02n 3/00, 7/00
U.S. Cl. 321—35          12 Claims

ABSTRACT OF THE DISCLOSURE

A tube operating with an external EMF applied between its anode and cathode and usable as a thyratron or rectifier, wherein the gas filling is of cesium vapor or the like, wherein the work function of the anode in operating condition is higher or at least equal to the work function of the cathode, and wherein the envelope is of refractory material, such as ceramics. The cathode is heatable either by heat of nuclear origin or by solar energy or by a flame, and the tube is usable in D.C. generators having a high internal impedance associated with nuclear or solar energy installations.

---

The present invention relates to gas-filled discharge tubes and to electrical energy generators operating by conversion of heat of a nuclear reactor or of solar energy or of a flame, and using such tubes.

It is known in the prior art that a direct current generator having a low impedance, i.e., operating with a relatively low voltage and relatively large current, may be realized by immersing into a nuclear reactor a stack of converter diodes, such as, for instance, cesium-vapor-filled diodes operating without any external voltage applied between their two electrodes, forming, respectively, the emitter and the collector of the diode. It is also known to use such a direct current source in an inverter circuit for the conversion of direct current into alternating current. This alternating current may again have its voltage transformed and rectified to obtain a direct current source having a high impedance, i.e., operating with a relatively high voltage and a relatively small current. The essential components of all these circuits are the gas-filled discharge tubes, either with or without control grid (thyratrons or rectifiers, respectively). When the tubes of this type are to be associated with a nuclear reactor, they must meet a number of special requirements, especially when installation of the reactor in a space vehicle is contemplated.

Among these requirements, the following may be mentioned:

(a) A high current capacity, i.e., high rating of output current per unitary weight;

(b) Ability of operating at high temperatures, for instance, between 500 and 1200° K.;

(c) Insensitivity to nuclear radiations;

(d) Insensitivity to orientation in space, to gravitational forces, to shocks and to accelerations.

Thyratrons and rectifiers are realized in the prior art as gas-filled discharge tubes having a filling either of a rare gas, such as argon, krypton or xenon, or of hydrogen or of mercury-vapor. However, none of these known tubes satisfies the entire set of the above-indicated requirements. The solid state devices (semiconductors) used as equivalents of corresponding discharge tubes have an even worse behavior as regards these requirements.

Accordingly, it is an object of the present invention to provide a gas-filled discharge tube having simultaneously the features of high current capacity, of ability of operating at high temperatures, and of insensitivity to nuclear radiations, to orientation in space, to gravitational forces, to shocks and to accelerations.

Another object of the present invention is a generator either of alternating current or of direct current with a high source impedance operating by conversion of heat of a nuclear reactor or of solar energy or of a flame and using tubes having the above-defined features and characteristics for realizing a reliable electrical energy generator able for use in spatial vehicle equipment.

These and other objects, features, and advantages of the present invention will become more obvious from the following description, when taken in connection with the accompanying drawing, which shows, for purposes of illustration only, several embodiments of the present invention, and wherein:

FIGURE 1 is an axial cross-sectional view through a thyratron according to the present invention;

FIGURE 2 shows a well-known inverter circuit, which is associated with at least one tube of FIGURE 1 or derived therefrom, when the direct current voltage which is to be converted into alternating current in this inverter, is obtained by conversion of heat of a nuclear reactor;

FIGURE 3 is a cross-sectional view showing the cathode of the tube of FIGURE 1 heated by an electrode of a converter diode integrated within a nuclear reactor;

FIGURE 4 is a schematic cross-sectional view showing at least one cathode of the tube of FIGURE 1 heated by solar energy;

FIGURE 5 shows a combination of a tube of FIGURE 1 with a stack of converter diodes, integrated within a nuclear reactor, with a view to the common use of the tank containing liquid alkali metal; and FIGURE 6 shows an electrode of a converter diode integrated within a nuclear reactor used for heating the cathode of a phanotron derived from the thyratron of FIGURE 1.

The present invention essentially consists of a gas-filled discharge tube including, in combination, at least two electrodes with means for applying therebetween an external potential difference so that one of said electrodes operates as an anode and the other as a cathode, an envelope capable of withstanding high temperatures, such as of ceramics sealed to metal, and a filling at least in part of alkali metal vapor, such as cesium, sodium, potassium, or rubidium, wherein said cathode is made of a material having at its normal operating temperature and in the presence of a deposit of said alkali metal, a work function less than or at most equal to the work function of the anode, this material being either an alkali-earth oxide or a refractory metal selected from the group consisting of tungsten, molybdenum, rhenium, tantalum, columbium, platinum and iridium.

The tube according to the present invention either may be provided with a control grid, in which case it would be a thyratron, or without any control grid, in that case being a vapor-filled rectifier called a phanotron.

The selection of respective materials for the cathode and the anode is just contrary in these tubes to well-known cesium vapor-filled converter diodes for the conversion of heat into electrical energy, i.e., to diodes operating without any externally applied voltage between their two electrodes. In these diodes, the work function of the emitter at its operating temperature should be relatively high, and, in any case, higher than the work function of the collector. To the contrary, in the tubes according to the present invention, with a view toward saving power and avoiding reverse current through the diode, the work function of the cathode should be as low as possible, and the work function of the anode should be relatively higher.

According to a development of the present invention, the cathode of a thyratron or phanotron as defined above could be heated by direct thermal contact with the collector of a converter diode integrated within a nuclear reactor. However, this cathode could also be heated by solar energy or by a flame.

The tanks containing the liquid alkali metal needed for the vapor-filling of the tubes according to the present invention could be either separate or in common with the tanks associated with the converter diodes having their emitter heated either by the heat of a nuclear reactor or by solar energy.

The present invention encompasses cylindrical and plane structures of the above-defined tubes.

FIGURE 1 shows an axial cross section of a thyraton according to the present invention. The tube has a cylindrical cathode, for instance, of molybdenum, having a massive or solid core 1 fitted at its surface with a network of lamellae 2 for increasing its emissive surface. The cathode 1, 2 is secured to a massive or solid body 3, for instance, of molybdenum, operative to transmit heat to the cathode. The cathode is surrounded by a cylindrical grid 4 secured to an insulating ring 5 supported on the body 3. The grid 4 is surrounded by a cylindrical anode 6, for instance, of tungsten, coating the internal surface of a ceramic envelope 7, for instance, of alumina or beryllium oxide, which is sealed to the metal body 3 to form the gas-tight enclosure of the tube. A set of fins 8 is fixed to the envelope 7 for cooling the anode. At the top of the envelope 7 is fixed a tank 9, for instance, of stainless steel, containing liquid cesium 10 and fitted with a set of cooling fins 11 for maintaining the temperature of the alkali metal tank at a value which is necessary for achieving a desired pressure of alkali vapor. The internal space of the thyratron communicates with the tank 9 through a tube 12, for instance, of stainless steel, electrically connected to the anode 6 and to the tank 9. There is shown a cathode lead 13 connected to the body 3, an anode lead 14 connected to the tank 9, and a control grid lead 15 passing through a hole in the wall of the tube 12 and through the body of the envelope 7, and connected to the control grid 4. A potential difference is to be applied by a source (not shown) between the leads 14 (positive pole) and 13 (negative pole).

The operating conditions of the tube are adjusted in such a manner that the cathode of molybdenum is carried to a temperature of about 1100° K., its work function in the presence of cesium vapor being then about 1.6 ev., while the anode of tungsten is carried to about 900° K., its work function being then about 1.8 ev. The temperature of the tank 9 would be then established near 750° K., and at this temperature the pressure of cesium vapor is established near 50 torr.

A phanotron may be derived directly from the thyratron of FIGURE 1, simply by eliminating the control grid 4 together with its lead-in connection 15.

FIGURE 2 shows a well-known inverter circuit, in which direct current input voltage of the source 16 is applied between interconnected cathodes of two thyratrons 17 and 18, on the one hand, and the mid-point of the primary winding of a transformer 19, on the other hand. The anodes of the thyratrons 17 and 18 are connected, respectively, to symmetrically positioned taps on the primary winding, and the grids of the thyratrons are respectively connected to two terminals of the same winding. A capacitor 20 is connected in shunt with the portion of the primary winding interconnecting the anodes of both thyratrons. It is known that in the circuit as described an alternating current voltage is collected between the secondary output terminals of the transformer 19, and this voltage could be rectified, if needed, by means of a phanotron 21, to obtain a direct current source with high impedance.

The input source 16 may be formed by a stack of converter diodes heated by the heat of a nuclear reactor, or by the sun, or by flames.

According to the present invention, the thyratrons 17 and 18 are of the type shown in FIGURE 1. Also, the phanotron 21, if used, is of the type directly derived from FIGURE 1 as indicated above.

According to a development of the present invention, the body 3 could be directly heated by the collector of the last converter diode of the stack which is immersed into a nuclear reactor. In FIGURE 3 is shown an embodiment in which the body 3 forms a single block with the collector 22 of the last diode, the emitter of which is shown at 23.

In the alternative shown in FIGURE 4, a plurality of bodies 3 are heated directly by contact with the external walls of a cavity 24 formed around the focus of a concentrator of solar energy 25. This arrangement has been already used for heating emitters of converter diodes; however, according to the present invention, it is used also for heating cathodes of thyratrons and eventually of phanotrons of the type shown in FIGURE 1, forming part of inverters having a direct current input delivered by the converter diodes.

While in FIGURE 1 a tank 9 is provided for feeding with cesium vapor a single thyratron only, and while this separate tank might make it possible to adjust cesium vapor pressure to an optimum value required for operation of each specific tube, it might be of constructive advantage to suppress this tank and to take advantage of the tank which is provided for feeding cesium vapor to converter diodes immersed in the reactor, for filling the thyratrons with the same vapor. It is then sufficient to provide through the body 3 inter-communication channels 26, shown in FIGURE 5, which represents schematically a stack of converter diodes with collectors 22 and emitters 23, cascading connections being established between successive emitters and collectors. This stack is to be immersed into a nuclear reactor (not shown). The collector of the last diode at the top is prolonged as in FIGURE 3 by the body 3 of the thyratron 7, which has, however, no longer a cesium tank surrounding the extremity of the anode tube 12, which is now closed. On the other hand, the emitter of the first diode at the bottom is prolonged by a cesium tank 27. Usual intercommunication channels 28 are provided between the successive diodes, and owing to these channels and also to the channels 26 provided according to the present invention between the internal spaces of the last diode and the thyratron, the tank 27 is used in common for the diodes and for the thyratron, so that the cesium vapor from the tank 27 fills the thyratron at the same time as the converter diodes.

The cathode of a phanotron derived from FIGURE 1 could also be heated by contact with the collector of the last diode. However, the diagram of FIGURE 2 shows that the cathode of the phanotron 21 is not carried at the potential of the negative pole of the source 16; therefore, electrical insulation is necessary between the phanotron and the last converter diode. As shown in FIGURE 6, similarly to FIGURE 3, the body 3, which is now supposed to be connected to the cathode of a phanotron, is brought against the collector 22 of the last diode with interposition of an insulating plate 29 made of a material ensuring good electrical insulation while having at the same time a relatively high thermal conductivity. Beryllium oxide may be cited as an example of such a material.

While we have shown and described several embodiments in accordance with the present invention, it is understood that the same is not limited thereto but is susceptible of numerous changes and modifications as known to a person skilled in the art. Especially, instead of cylindrical structures of thyratrons or phanotrons, equivalent plane structures could be easily designed. The selection of materials as described could be modified by substituting other materials having similar operational characteristics. The alkali metal vapor used for filling the discharge tubes according to the present invention could be mixed in suitable proportion with a rare gas, in order to emphasize desired characteristics of the tube. A source of flames could be used for heating the cathodes. Therefore, we do not wish to be limited to the details shown and described herein but intend to cover all such changes and modifications as are obvious to one of ordinary skill in the art.

We claim:
1. A gas-filled discharge tube including, at least two electrodes in an envelope mode of a heat-resistive material, and a filling consisting at least in part of alkali metal vapor, one electrode being made of material having at its normal operating temperature and environment a work function at most equal to the work function of the other electrode in combination with an external source of potential connected between said electrodes so that said one electrode operates as a cathode and said other electrode operates as an anode.
2. A tube as claimed in claim 1, wherein said alkali metal is selected from the group consisting of cesium, sodium, potassium, and rubidium.
3. A tube as claimed in claim 1, wherein said cathode material is selected from the group consisting of alkaline-earth oxides, tungsten, molybdenum, rhenium, tantalum, columbium, platinum, and iridium.
4. A tube as claimed in claim 1, further comprising means for electrostatically starting the ionization thereby constituting a thyratron.
5. A tube as claimed in claim 1, in combination with heating means for said cathode electrode providing heat delivered from a nuclear reactor.
6. A tube as claimed in claim 1, in combination with heating means by solar energy for said cathode electrode.
7. A tube as claimed in claim 1, in combination with a source of flames for heating said cathode electrode.
8. A tube as claimed in claim 1, wherein the work function of the cathode electrode is lower than the work function of the anode electrode in operation.
9. In a current generator the combination comprising:
a gas-filled discharge tube including at least two electrodes in an envelope of a heat resistive material, and a filling consisting at least in part of alkali metal vapor, one electrode being made of material having at its normal operating temperature and environment a work function at most equal to the work function of the other said electrode in combination with an external source of potential connected between said electrodes so that said one electrode operates as a cathode and said other electrode operates as an anode, and means for electrostatically starting the ionization in said envelope, and
at least one convertor diode comprising an emitter and a collector, means for heating said emitter with heat derived from a nuclear reactor, and connecting means connecting said cathode electrode of said discharge tube with said collector to effect transfer of heat therebetween.
10. The combination as claimed in claim 9, wherein said cathode electrode of said discharge tube and said collector of said diode form a single metal block.
11. The combination defined in claim 9 wherein at least one channel is provided between said discharge tube and said diode to provide for intercommunication between the internal spaces thereof.
12. In a current generator the combination comprising:
a gas-filled discharge tube including at least two electrodes in an envelope of a heat resistive material, and a filling consisting at least in part of alkali metal vapor, one electrode being made of material having at its normal operating temperature and environment a work function at most equal to the work function of the other said electrode in combination with an external source of potential connected between said electrodes so that said one electrode operates as a cathode and said other electrode operates as an anode,
at least one convertor diode comprising an emitter and a collector, means for heating said emitter with heat derived from a nuclear reactor, and connecting means connecting said cathode electrode of said discharge tube with said collector to effect transfer of heat therebetween,
said connecting means being provided in the form of a thermally conducting and electrically insulating member.

References Cited
UNITED STATES PATENTS

| | | | |
|---|---|---|---|
| 2,341,920 | 2/1944 | Hull | 313—227 X |
| 2,595,634 | 5/1952 | Boyer | 313—227 X |
| 2,927,240 | 3/1960 | Vanderslice | 313—212 X |
| 3,021,472 | 2/1962 | Hernquist | 313—212 X |
| 3,243,632 | 3/1966 | White | 313—212 X |
| 2,899,590 | 8/1959 | Sorg et al. | 313—250 |
| 2,929,013 | 3/1960 | McNamee | 321—35 |
| 2,980,819 | 4/1961 | Feaster | 310—4 |
| 3,093,757 | 6/1963 | Lederer | 310—4 |
| 3,119,059 | 1/1964 | Hall et al. | 322—2 |
| 3,217,189 | 11/1965 | Bloss | 310—4 |
| 3,278,768 | 10/1966 | Bernstein | 310—4 |
| 3,329,839 | 7/1967 | Devin | 310—4 |

FOREIGN PATENTS 269,032    1928    Great Britain.

JOHN F. COUCH, Primary Examiner

G. GOLDBERG, Assistant Examiner

U.S. Cl. X.R.

310—4; 313—212, 218, 227, 310